United States Patent [19]
Rune

[11] Patent Number: 5,850,444
[45] Date of Patent: Dec. 15, 1998

[54] METHOD AND APPARATUS FOR ENCRYPTING RADIO TRAFFIC IN A TELECOMMUNICATIONS NETWORK

[75] Inventor: Johan Rune, Lidingö, Sweden

[73] Assignee: Telefonaktienbolaget L/M Ericsson (publ), Stockholm, Sweden

[21] Appl. No.: 708,796

[22] Filed: Sep. 9, 1996

[51] Int. Cl.⁶ .............................. H04K 9/00; H04K 1/00
[52] U.S. Cl. ................... 380/21; 380/30; 380/49
[58] Field of Search .................... 380/30, 21, 49

[56] References Cited

U.S. PATENT DOCUMENTS

| | | | |
|---|---|---|---|
| 5,073,935 | 12/1991 | Pastor | 380/30 |
| 5,124,117 | 6/1992 | Tatebayashi et al. | 380/30 |
| 5,222,140 | 6/1993 | Beller et al. | 380/30 |
| 5,299,263 | 3/1994 | Beller et al. | 380/30 |
| 5,406,628 | 4/1995 | Beller et al. | 380/30 |
| 5,515,441 | 5/1996 | Faucher | 380/30 |

FOREIGN PATENT DOCUMENTS

| | | |
|---|---|---|
| 0 067 977 A1 | 12/1982 | European Pat. Off. . |
| 07203540 | 8/1995 | Japan . |
| PCT/SE96/00510 | 4/1996 | Sweden . |
| 2 297 016 | 7/1996 | United Kingdom . |

OTHER PUBLICATIONS

*Distributed Communication Services in the Masix System* by Franck Mével, Laboratoire MASI, Université Paris VI 4 place Jussieu, 75252 Paris Cedex 05, France.
Julien Simon Laboratoire Sysmic, Institut Supérieur d'Electronique de Paris 21 rue d'Assas, 75006 Paris, France Published Mar. 27, 1996 XP000594787 IEEE.
*The First Ten Years of Public–Key Cryptography*, Whitfield Diffie Proceedings of the IEEE, vol. 76, No. 5, May 1988.

*Primary Examiner*—David Cain
*Attorney, Agent, or Firm*—Jenkens & Gilchrist, P.C.

[57] ABSTRACT

A generic communications network provides an encrypted communications interface between service networks and their subscribers. When communications are initiated between a subscribing communications terminal and the generic network, the terminal compares a stored network identifier associated with a stored public key, with a unique identifier broadcast by the generic network. If a match is found, the terminal generates a random secret key, encrypts the secret key with the stored public key, and transmits the encrypted secret key. The generic communications network decrypts the secret key using a private key associated with the public key. The secret key is used thereafter by the terminal and the generic network to encrypt and decrypt the ensuing radio traffic. Consequently, the network can maintain secure communications with the terminal without ever knowing the terminal's identity.

46 Claims, 3 Drawing Sheets

METHOD AND APPARATUS FOR ENCRYPTING RADIO TRAFFIC IN A TELECOMMUNICATIONS NETWORK

BACKGROUND OF THE INVENTION

1. Technical Field of the Invention

The present invention relates generally to the field of wireless radio communications and, in particular, to a method and apparatus for encrypting radio traffic between terminals and a mobile communications network.

2. Description of Related Art

The need for increased mobility and versatility in telecommunications networks requires the networks to cover larger geographical areas and provide a broader range of telecommunications services to subscribers. These telecommunications services include teleservices and bearer services. The teleservice provides the necessary hardware and software for a subscriber to communicate with another subscriber (e.g., terminal, etc.). The bearer service provides the capacity required to transmit appropriate signals between two access points (e.g., ports) that provide an interface with a network. Telecommunications services can be provided to subscribers by a number of service networks, such as, for example, public land mobile telecommunications networks (PLMNs), public switched telephone networks (PSTNs), integrated services digital networks (ISDNs), the so-called "Internet" access networks, video on demand (VOD) networks, and other proprietary service networks.

In response to the need for increased mobility and versatility, a new mobile radio telecommunications network is being developed, which has a generic interface through which a service network subscriber can be connected with that service network regardless of the subscriber's geographic location. This generic mobile radio network is referred to as the "Generic Access Network" (GAN). In order to more readily understand the present invention, which deals primarily with encrypting communications traffic between terminals and a GAN, a brief description of such a GAN is provided below with respect to FIG. 1.

FIG. 1 is a perspective view of an exemplary GAN connected to a plurality of service networks and service network subscribers. The GAN (10) illustrated by FIG. 1 includes an access network interconnected with a transport network. The access network includes a plurality of base stations (e.g., BS1 and BS2). Each base station includes a radio transmitter and receiver that provides communications coverage for a respective geographical area (e.g., a so-called cell, C1 and C2). The base stations are connected to a radio network controller (RNC) 12. Although not shown explicitly, certain of the base stations can be connected to RNC 12 (e.g., BS1 and BS2), and certain other of the base stations can be connected to one or more other RNCs. A plurality of the RNCs can be interconnected to provide a communications path therebetween. The RNCs distribute signals to and from the connected base stations.

A plurality of service networks (e.g., VOD network, PLMN, PSTN, Internet) are connected through respective access input ports (14, 16, 18, 20, 22, 24 and 26) to the access network of GAN 10. Each service network uses its own standard signaling protocol to communicate between its internal signaling nodes. For example, the Global System for Mobile communications (GSM), which is a digital cellular PLMN that has been fielded throughout Europe, uses the Multiple Application Part (MAP) signaling protocol. As illustrated by FIG. 1, the RNCs in the access network are connected through at least one of the access input ports to a service network. As shown, RNC 12 is connected through access ports 20 and 24, respectively, to the PLMN and PSTN service networks.

Mobile terminals 28 and 30 are located within the radio coverage area of GAN 10, and can establish a connection with each of the base stations (e.g., BS2) in the access network. These mobile terminals can be, for example, a cellular phone, mobile radiotelephone, personal computer (notebook, laptop, etc.) possibly connected to a digital cellular phone, or mobile television receiver (for VOD). Signal transport between a mobile terminal and a selected service network takes place over specified signal carriers. For example, signals are transported between the cellular phone (28) and the PLMN service network over signal carriers SC1 and SC2.

The mobile terminals (e.g., 28 and 30) include an access section and service network section. The access section of a mobile terminal is a logical part of the access network and handles the signaling required to establish the signal carrier (e.g., SC2 and SC4) between the mobile terminals and RNC 12. The service network section of a mobile terminal is a logical part of the service network to which that terminal's user subscribes. The service network section of a mobile terminal receives and transmits signals, in accordance with the specified standards of its related service network, via the established signal carriers SC1 and SC2 (or SC4). The radio interface portion of the signal carrier SC2 or SC4 (between the mobile terminal and base station) can be time division multiple access (TDMA), code division multiple access (CDMA), or any other type of multiple access interface.

The service network subscribers can access their respective service network through the GAN. The GAN provides a signal carrier interface that allows a message to be transported transparently over a signal carrier (e.g., SC1 and SC2) between the service network part of a mobile terminal and its service network. The GAN accomplishes this function by matching the characteristics of the signaling connections and traffic connections of all of the service networks that connect to it. Consequently, the GAN can extend the coverage of existing service networks and also increase the subscribers' degree of mobility.

A unique characteristic of a GAN is that it has no subscribers of its own. The mobile users of the GAN are permanent subscribers to their own service networks, but they are only temporary users of the GAN. Consequently, a GAN does not know (or need to know) the identity of these users. However, a problem arises in attempting to encrypt radio traffic between the mobile terminals and the GAN.

Radio traffic (e.g., speech information or data) between mobile terminals and base stations is typically encrypted to ensure that the information being passed remains confidential. Although some service networks (e.g., GSM) encrypt traffic, most other service networks do not. Consequently, a GAN should be capable of encrypting traffic for those service networks that do not have that capability. However, since a GAN does not know the identity of its users (the service network subscribers), it must be capable of encrypting radio traffic using encryption keys that are created without knowing a subscribing terminal's identity or authenticity. Unfortunately, most existing mobile communications networks use encryption techniques that generate encryption keys by using authentication parameters. In other words, to encrypt radio traffic in a conventional mobile communications network, the user terminal's identity must be known.

SUMMARY OF THE INVENTION

It is an object of the present invention to encrypt communications between a mobile terminal and a communications network without requiring the network to know the identity of the terminal.

It is also an object of the present invention to encrypt communications between a plurality of mobile terminals and a communications network without requiring the network to maintain individual encryption keys for each of the terminals.

It is another object of the present invention to encrypt communications between a mobile terminal and a communications network without requiring the terminal to permanently store a secret encryption key.

It is yet another object of the present invention to minimize call setup time, minimize transmission delays, and maximize data throughput, while encrypting communications between a mobile terminal and a communications network.

In accordance with one aspect of the present invention, a method is provided for encrypting communications between a communications network and a communications terminal, by storing a public key associated with the network at the terminal, generating a secret key at the terminal, encrypting the secret key with the stored public key at the terminal, transmitting the encrypted secret key from the terminal, receiving the encrypted secret key at the network, decrypting the received encrypted secret key with a private key, where the private key is associated with the public key, and encrypting the ensuing traffic with the secret key. If a public key has not been stored at the terminal, then the terminal transmits a request to the network for a public key. As such, the network is not required to know the identity of the terminal in order to maintain encrypted communications with the terminal.

In accordance with another aspect of the present invention, the foregoing and other objects are achieved by a method and an apparatus for encrypting traffic between a communications network and a communications terminal by broadcasting a (asymmetric) public key from the network. The public key is received by the terminal. The network maintains a private key that can be used to decrypt information encrypted with the public key. The terminal generates and stores a naturally occurring random number as a secret session (symmetric) key, encrypts the symmetric session key with the public key, and transmits the encrypted session key to the network. The network decrypts the session key with the private key, and both the network and terminal encrypt the ensuing communications with the secret session key. Again, the communications network is not required to know the identity of the terminal in order to maintain encrypted communications with the terminal.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–5 of the drawings, like numerals being used for like and corresponding parts of the various drawings.

Essentially, in accordance with a preferred embodiment of the present invention, a mobile terminal stores at least one public key, along with a unique identification character of at least one GAN associated with that public key, in a memory location. A GAN continuously broadcasts its unique identification character in all cells connected to that GAN. When contact is initiated between the terminal and that GAN, the terminal compares the received identifier with the stored identifier(s), and if a match can be made, the terminal generates a random secret key, encrypts the secret key with the public key associated with that GAN's identifier, and transmits the encrypted secret key. The GAN decrypts the secret key using a private key associated with the public key. The secret key is used thereafter by the terminal and the GAN to encrypt and decrypt the ensuing radio traffic. Notably, the GAN can maintain secure communications with the terminal without ever knowing the terminal's identity. Furthermore, since the GAN does not need to know the identity of such a terminal, the GAN is not required to maintain a database of individual terminal encryption keys. Additionally, the terminal is not required to store its own secret key, because it can generate a new secret key for each communications session.

Figure 1:
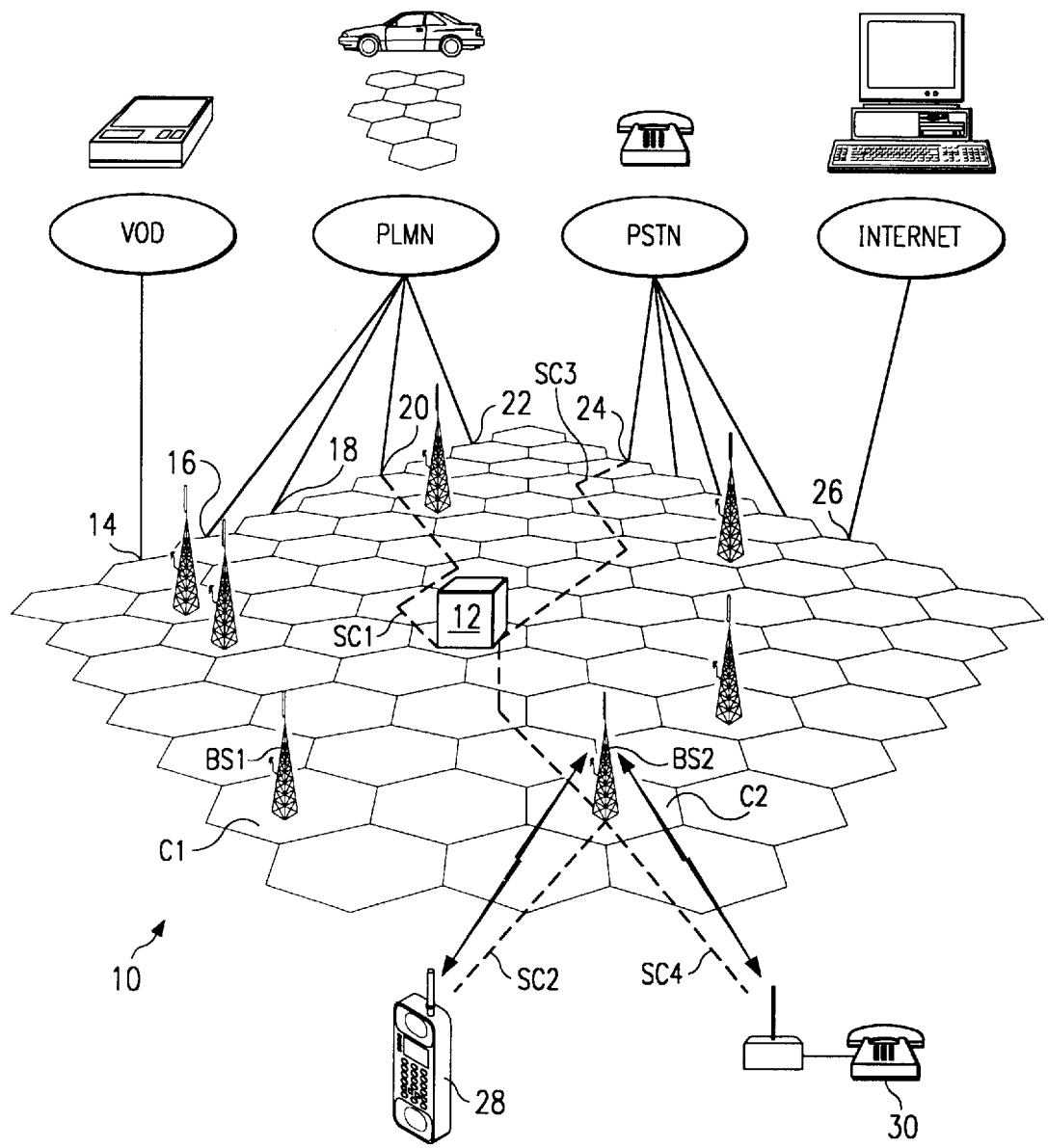
FIG. 1 is a perspective view of an exemplary generic access network connected to a plurality of service networks and service network subscribers.
Figure 2:
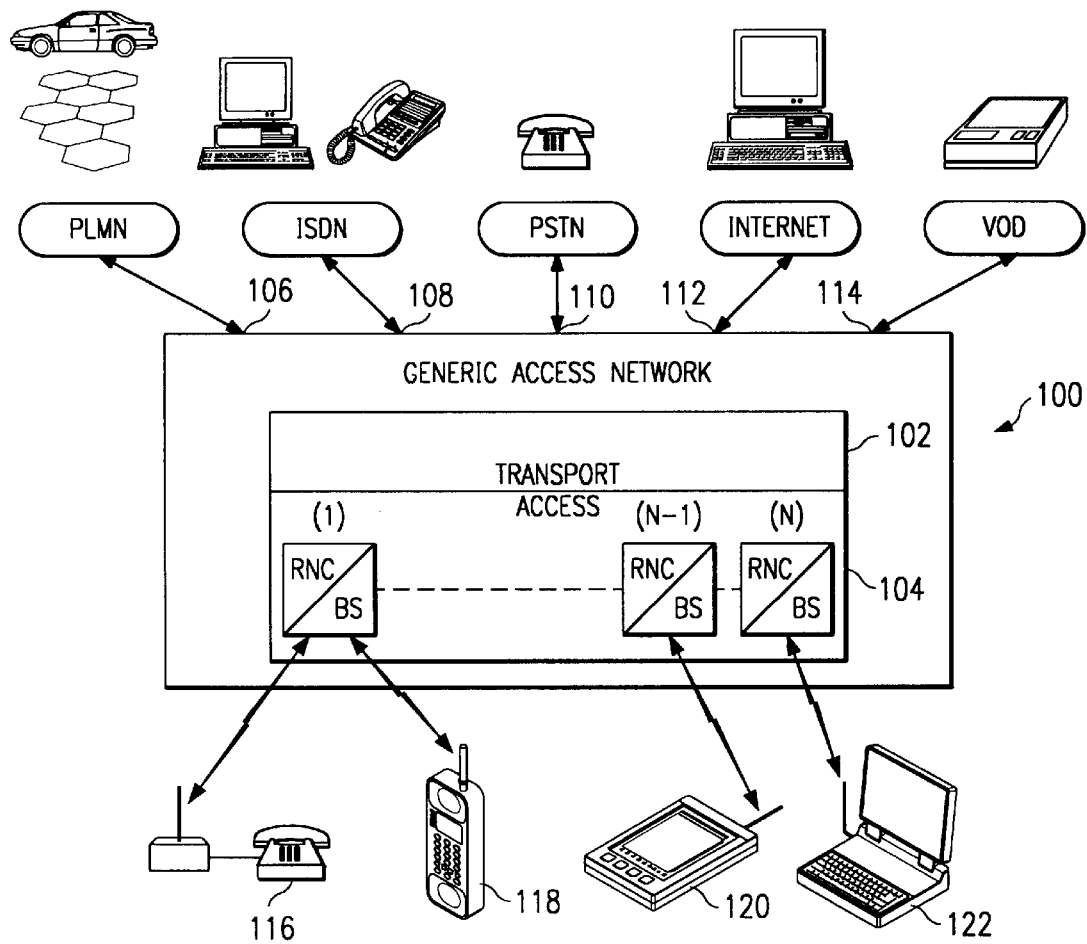
FIG. 2 is a top level schematic block diagram of a generic access network in which a method of encrypting radio traffic between service networks and service network subscribers can be implemented, in accordance with a preferred embodiment of the present invention.

FIG. 2 is a top level schematic block diagram of a generic access network in which a method of encrypting radio traffic between service networks and service network subscribers can be implemented, in accordance with a preferred embodiment of the present invention. A GAN 100 is shown, which includes a transport network 102 interconnected with an access network 104. A plurality of service networks (e.g., PLMN, ISDN, PSTN, INTERNET, VOD) are connected through respective access ports (e.g., 106, 108, 110, 112, 114) to transport network 102 and access network 104. Access network 104 includes a plurality of RNCs and associated base stations (e.g., RNC(1)–RNC(N)). The plurality of RNCs and associated base stations are connected by a respective radio interface to a plurality of mobile transceivers (terminals) 116, 118, 120 and 122. A user of each mobile terminal is a subscriber to at least one of the service networks PLMN, etc. The mobile terminals can communicate with their respective service networks in the manner described above with respect to FIG. 1. More specifically, the RNCs control communications between the terminals and their respective service networks. Notably, although a plurality of mobile terminals (116, etc.) are shown in FIG. 2, this is for illustrative purposes only. One or more fixed radio terminals may also be connected to GAN 100 and are thus capable of communicating with at least one of the service networks.

Figure 3:
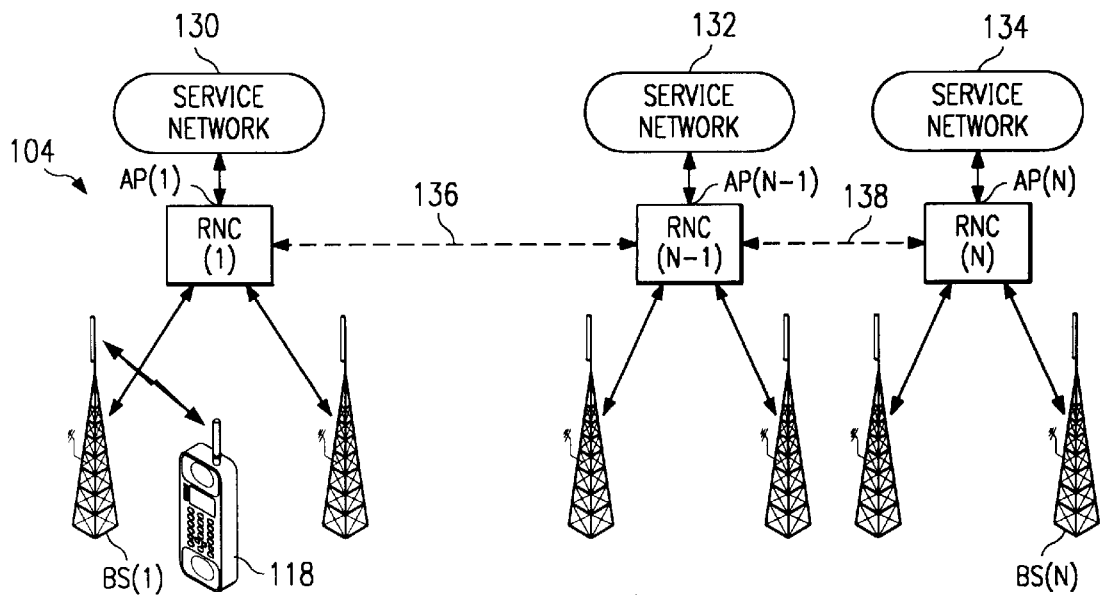
FIG. 3 is a schematic block diagram of the access network illustrated in FIG. 2.

FIG. 3 is a schematic block diagram of access network 104 illustrated in FIG. 2. Access network 104 includes a plurality of RNCs (e.g., RNC(1)–RNC(N)). However, although a plurality of RNCs is shown for this embodiment, the present invention can be implemented with only one RNC. At least one service network (e.g., 130, 132, 134) is connected through at least one respective access port (e.g., AP1, AP(N–1), AP(N)) to at least one RNC. At least one base station (e.g., BS(1), BS(N)) is connected to a respective RNC (e.g., RNC(1), RNC(N)). Although a plurality of base stations is shown, the present invention can be implemented with only one base station.

A mobile terminal (e.g., cellular phone 118) is connected by a radio interface to base station BS(1). It should be readily understood that one terminal (118) is shown for illustrative purposes only and that one or more additional terminals could be shown. The RNCs (e.g., RNC(1)–RNC(N)) are interconnected by communications lines (136, 138) for communications therebetween. Consequently, terminal 118 can establish communications with any of the service networks (e.g., 130, 132, 134) through access network 104 and GAN 100 (FIG. 2). Notably, the coverage provided for each service network can be enlarged by switching to a different access port of access network 104. In other words, terminal 118 can communicate with service network 132 through RNC(1), interconnecting line 136, and RNC(N–1). Alternatively, if service network 132 is switched to access port AP(1), terminal 118 can communicate with service network 132 through RNC(1).

Figure 4:
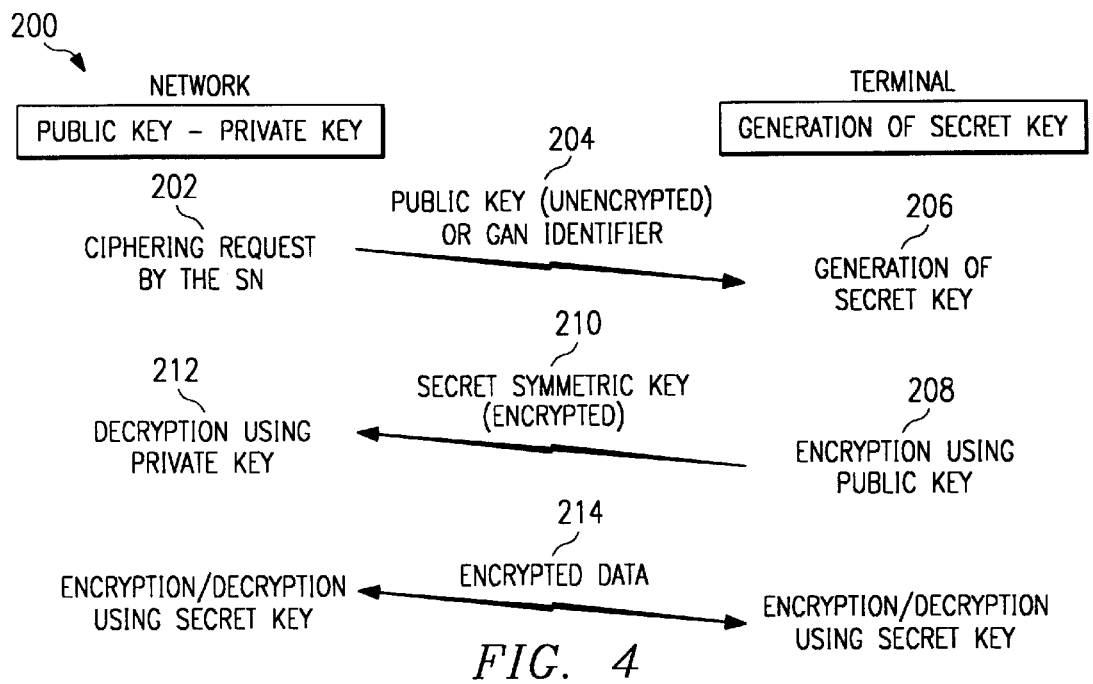
FIG. 4 is a sequence diagram that illustrates a method that can be used to encrypt radio communications between a generic access network and a terminal, in accordance with a preferred embodiment of the present invention.

FIG. 4 is a sequence diagram that illustrates a method that can be used to encrypt radio communications between a generic access network and a terminal, in accordance with a preferred embodiment of the present invention. The method 200 of encrypting communications can begin at the GAN or the terminal. For example, in this embodiment, at step 204, the GAN (e.g., 10) continuously broadcasts a unique identification character in all cells connected to that GAN. The terminal (e.g., 118) contains a non-volatile memory located in a GAN section of the terminal. The terminal stores at least one public key in the non-volatile memory. Along with each public key, the terminal also stores a respective expiration date for the key, and a GAN identification character that identifies a specific GAN associated with that key. In other words, each public key stored in the terminals memory is thereby associated with a specific GAN. The terminal initiates contact by registering with a GAN (but not necessarily setting up a call). A processor in the terminal compares the received GAN identifier with the stored identifiers, and if a match can be made (and the key has not expired), the processor retrieves the stored public key associated with the identified GAN. However, in the event that no such match is found, the terminal sends a request for the GAN to transmit a public key. The transmitted public key (and its expiration date) is stored in the terminal and can be used to encrypt a secret key in the current and ensuing communication sessions.

At step 206, the terminal generates a (symmetric) secret key (described in detail below). At step 208, the terminal uses the retrieved public key to encrypt the secret key. At step 210, the terminal transmits the encrypted secret key to the identified GAN. At step 212, the GAN decrypts the secret key, which, at step 214, is used by the GAN and the terminal for encrypting traffic during the ensuing communications session (described in detail below).

Alternatively, at the end of a session with a GAN, the terminal stores the public key used for that session. When the terminal or a GAN begins a new communications session, the terminal retrieves the public key stored from the last session with a GAN, and uses that public key to encrypt a secret key to be used for the ensuing session. If the use of that stored public key is unsuccessful, the terminal then sends a request to the GAN for a new public key. This technique advantageously increases network throughput, because a network channel is not tied up transmitting a public key. However, if a public key has not been stored from a past session with a particular GAN, the terminal can still receive the public key by requesting it from the GAN and using it to encrypt a secret key that will be used for the ensuing session. In any event, by storing the relatively large (bit-wise) public keys in the terminal, as opposed to transmitting them from the GAN, radio transmission delays can be reduced significantly, a substantial amount of network transmission time can be saved, and data throughput will be increased.

FIG. 4 also illustrates a method that can be used to encrypt radio communications between a generic access network and a mobile terminal, in accordance with another embodiment of the present invention. For example, when communications are desired between a service network and a terminal (e.g., PLMN and terminal 118), the service network or terminal can initiate communications with a call setup message. At step 202, as the initial connection between the GAN and the terminal is established, the service network can request that the ensuing traffic will be encrypted. If so, at step 204, still during the initial call setup process, the terminal receives a public key which is continuously broadcast from one or more base stations (e.g., BS(1)–BS(N)).

In this embodiment, all of the RNCs maintain at least one public key/private key pair (the same pair in every RNC) in a memory storage location. The public key that was broadcast by the GAN is received by the terminal (118) that has initiated contact with that GAN. Preferably, both the call setup procedure and the procedure to transfer the public key is performed by an RNC, which is connected through an access port to the service network of interest (e.g., RNC(1) to AP(1) to PLMN 130). Alternatively, a base station (e.g., BS1) can be configured to maintain public/private key pairs and broadcast or otherwise transfer a public key to a terminal.

The RNC can broadcast the public key in all cells in the RNC's coverage area. Consequently, since the GAN broadcasts the public key instead of having the terminal request the key from the GAN, the terminal can register with the GAN much faster, and a call can be set up in a substantially shorter period of time. Alternatively, instead of broadcasting the public key in a plurality of cells, the RNC can transfer the public key directly through the base station that has established contact with the terminal. However, the method of broadcasting the public key in a plurality of cells before call setup advantageously decreases the load on the GAN's dedicated traffic channels.

For all embodiments, as long as the terminal is registered with the GAN, the same public key can be used for all subsequent communications with that GAN, because the same key is stored at the GAN and also at the terminal. Alternatively, the public key can be changed periodically in accordance with a predetermined scheme or algorithm, or even at the whim of the GAN operator. If an operator desires to change public keys periodically, storing each public key's expiration date at the terminal facilitates their use in that regard. Furthermore, in the preferred embodiment, when the public key is changed, it can be broadcast by the GAN for a predetermined period of time, to minimize the number of terminal requests for a new public key.

As described earlier, at step 202, the GAN can maintain one or more asymmetric public key/private key pairs. In that event, a so-called "RSA Algorithm" can be used to create the public key/private key pairs. The RSA Algorithm combines the difficulty of factoring a prime number with the ease of generating large prime numbers (using a probabilistic algorithm) to split an encryption key into a public part and a private part.

Specifically, assuming that the letters P and Q represent prime numbers, the letter M represents an unencrypted message, and the letter C represents the encrypted form of M, the RSA Algorithm can be expressed as follows:

$$M^E \bmod PQ \rightarrow C \text{ (encrypted message M)} \tag{1}$$

$$C^D \bmod PQ \rightarrow M \text{ (decrypted message C)} \tag{2}$$

where the term (DE−1) is a multiple of (P−1)(Q−1). In this embodiment, the exponent E is set to 3. The private and public keys are each composed of two numbers. For example, the numbers represented by (PQ, D) make up the private key, and the numbers represented by (PQ, E) make up the public key. Since the same value for E is used consistently, only the PQ portion of the number need be sent on request or broadcast and used for the public key (e.g., at step 204). By knowing the private key, any message encrypted with the public key can be decrypted.

Returning to FIG. 4, at step 206, the terminal (118) receives and/or stores the asymmetric public key. The terminal generates a random symmetric secret key. The random secret key, which is used to encrypt communications preferably for the complete session, can be generated in at least one of four ways. Using one method, the terminal takes several samples from measurements of the strength of the received signal, concatenates the lower order bits of the several samples, and processes the result to produce a random number. Since the lower order bits of the received signal are well within the noise level of the received signal, a naturally occurring, truly random number is generated. A second random number generating method is to use the random noise signal created at the input of an A/D converter connected to a microphone. Again, using this method, a naturally occurring, truly random number can be generated for the secret key. A third random number generating method is for the terminal to take samples from phase measurements of the received signal, concatenate the lower order bits of the samples, and process the result to produce a random number. A fourth random number generating method is for the terminal to take samples from the encoding section of the speech codec, concatenate the lower order bits of the samples, and process the result to produce the random number.

Alternatively, a random number generated at the terminal can be used as a seed for a pseudorandom number generator. The seed is encrypted with the public key from the GAN, and transmitted to the GAN. The seed is used simultaneously in the GAN and the terminal to produce a pseudorandom number. The pseudorandom number thus generated can be used by the GAN and the terminal as the secret key for the ensuing communications session.

The session key can be changed periodically to a different number in the pseudorandom number sequence. For example, the session key can be changed for a number of reasons, such as after a predetermined amount of data has been encrypted, or after traffic has been encrypted for a predetermined amount of time. The terminal or the GAN can initiate a change of the secret key, or the key can be changed according to a predetermined scheme or algorithm. For example, a request to change the secret session key can be implemented by transmitting a "session key change request" message, or by setting a "session key change request" bit in the header of a transmitted message.

Additionally, shorter session keys can be generated and less complicated encryption algorithms can be used with the pseudorandom number generation method described above. Consequently, a substantial amount of processing power can be saved in the GAN and especially in the terminal. The terminal can be configured to select the length of the session key to be used, in order to address trade offs between security and computational requirements. For example, the terminal's processor can select the length of a secret session key by generating a session key at that length, or by specifying the number of bits to be used from the output of the pseudorandom number generator. Alternatively, the terminal can specify the range of the output of the pseudorandom number generator to set a predetermined length.

Other alternative methods may be used to generate a pseudorandom number for a secret session key. For example, using a "Lagged Fibonacci" type of pseudorandom number generator, the $n^{th}$ number in the pseudorandom number sequence, $N_n$, can be calculated as follows:

$$N_n = (N_{n-k} - N_{n-1}) \bmod M \tag{3}$$

where k and l are the so-called lags, and M defines the range of the pseudorandom numbers to be generated. For optimum results, the largest lag should be between 1000 and 10000. If a relatively long key is desired, a plurality of the pseudorandom numbers produced by equation 3 can be concatenated to produce a longer key. If the pseudorandom numbers produced by equation 3 are to be floating point numbers between 0 and 1, M can be set to 1. The bit patterns of such floating point pseudorandom numbers can be used as symmetric encryption keys.

Another pseudorandom number generator that can be used to create a secret session key is based on an algorithm that produces pseudorandom numbers uniformly distributed between 0 and 1. Specifically, the seeds $X_0$, $Y_0$ and $Z_0$ of the pseudorandom numbers $N_n$ are initially set to integer values between 1 and 30000. The pseudorandom numbers $N_n$ are then calculated as follows:

$$X_n = 171 * (X_{n-1} \bmod 177) - (2 * X_{n-1}/177) \tag{4}$$

$$Y_n = 172 * (Y_{n-1} \bmod 176) - (35 * Y_{n-1}/176) \tag{5}$$

$$Z_n = 170 * (Z_{n-1} \bmod 178) - (63 * Z_{n-1}/178) \tag{6}$$

If any of the values of $X_n$, $Y_n$ or $Z_n$ are less than zero, respectively, then $X_n$ is set equal to $X_n+30269$, $Y_n$ is set equal to $Y_n+30307$, or $Z_n$ is set equal to $Z_n+30323$. The pseudorandom numbers $N_n$ are then equal to $((X_n/30269 + Y_n/30307 + Z_n/30323)$ amod 1), where $X_n$, $Y_n$ and $Z_n$ are floating point numbers, and "amod" means that these numbers can be fractions. The floating point numbers generated with this algorithm form bit patterns that are suitable for use as symmetric encryption keys. The length of such keys can be extended by concatenating a plurality of the pseudorandom numbers generated.

Returning to the method illustrated by FIG. 4, at step 208, preferably using the above-described RSA Algorithm, the terminal encrypts the secret symmetric key with the public key. For example, assume that the secret symmetric key generated at the terminal is represented by the letters SK. Using equation 1 of the RSA Algorithm, the secret key is encrypted as follows:

$$M^E \bmod PQ \to C$$

where (PQ, E) represents the public key, M is equal to SK, and C is the encrypted version of SK. The exponent E is set to 3.

In the preferred embodiment, the terminal places the encrypted secret key into a message format, which includes a header and message field. The header provides control information associated with the encrypted secret key that follows in the message field. A bit in the header can be set to indicate that the message field that follows the header is encrypted. In other words, only the secret key field of the message is encrypted. The header of the message is transmitted in the clear. Consequently, a substantial amount of network processing time can be saved at the RNC, since the header indicates whether the subsequent message field is encrypted, and if so, only that portion of the message is to be decrypted.

At step 210, the terminal (118) transmits the encrypted secret key (C) to the GAN via the contacted base station (e.g., BS(1)). In the preferred embodiment, this secret key is used for the ensuing communications. Alternatively, at any time during the ensuing communications session, the terminal can generate a new secret key, encrypt it with the public key, and transmit the new encrypted secret key to the GAN. The security of the session is thereby increased, because by reducing the amount of time that a particular secret key is used for a session, the likelihood that the secret key will be broken by an unauthorized user is also reduced.

At step 212, the RNC (e.g., RNC(1)) receives the encrypted secret key (C) from the base station, and decrypts the secret key using the private key part of the RSA Algorithm. For example, using equation 2 (above) of the RSA Algorithm, the received encrypted secret key (C) is decrypted as follows:

$$C^D \bmod PQ \to M$$

where (PQ, D) represents the private key, and M is equal to SK (secret key).

At step 214, the ensuing radio traffic between the RNC and the terminal is encrypted and decrypted with the secret key, which is now known to both the RNC and the terminal. A known symmetric encryption algorithm can be used to encrypt and decrypt the ensuing radio traffic with the secret key, such as, for example, a one, two or three pass Data Encryption Standard (DES) algorithm, or a Fast Encipherment Algorithm (FEAL).

As yet another encryption alternative, instead of using the RSA Algorithm to create a public/private key pair, a so-called Diffie-Hellman "exponential key exchange" algorithm can be used to let the terminal and the GAN agree on a secret session key. In using this encryption scheme, two numbers ($\alpha$, q) are stored at the GAN. At the beginning of a communications session, the RNC transmits the two numbers directly (or broadcasts the numbers) to the terminal. The numbers $\alpha$ and q are required to meet the following criteria: q is a large prime number that defines the finite (Galios) field GF(q)=1, 2 ..., q-1; and $\alpha$ is a fixed primitive element of GF(q). In other words, the exponents (x) of ($\alpha^x$ mod q) produce all of the elements 1,2 ..., q-1 of GF(q). In order to generate an agreed to secret session key, the two numbers ($\alpha$, q) are transmitted directly (or broadcast) from the GAN to the terminal. Alternatively, the two numbers can be already resident in the terminal's non-volatile memory. The terminal (118) generates the random number $X_T(1<X_T<q-1)$, and computes the value of $Y_T=\alpha^{X_T} \bmod q$.

The GAN (e.g., the RNC or base station) generates the random number $X_G(1<X_G<q-1)$, and computes the value of $Y_G=\alpha^{X_G} \bmod q$. The random numbers can be generated at the terminal using the methods described above with respect to generating naturally occurring, truly random numbers.

$Y_T$ and $Y_G$ are transferred unencrypted to the respective GAN and terminal. Upon receipt of the number $Y_G$, the terminal calculates the value of $K_S=Y_G^{X_T} \bmod q = \alpha^{X_G X_T} \bmod q$. Upon receipt of the number $Y_T$, the GAN calculates the value of $K_S=Y_T^{X_G} \bmod q = \alpha^{X_T X_G} \bmod q$. The number $X_T$ is kept secret at the terminal, the number $X_G$ is kept secret at the GAN, but the value of $K_S$ is now known at both the terminal and the GAN. The number $K_S$ is therefore used by both as the communications session encryption key. An unauthorized user would not know either $X_T$ or $X_G$ and would have to compute the key $K_S$ from $Y_T$ and $Y_G$, which is a prohibitive computational process. A significant security advantage of using the exponential key exchange algorithm is that the GAN is not required to maintain secret private key data on a permanent basis.

In summary, when a communications session is first initiated between a GAN and a terminal, the terminal receives an asymmetric public key that has been continuously broadcast by the GAN, retrieved from the terminal's internal memory, or requested from the GAN. The GAN maintains a private key that can be used to decrypt information encrypted with the public key. The terminal generates and stores a naturally occurring random number as a secret session (symmetric) key, encrypts the symmetric session key with the public key, and transmits the encrypted session key to the GAN. The GAN decrypts the session key with the private key, and both the GAN and terminal encrypt the ensuing communications with the secret session key. A primary technical advantage of transferring a public key from a GAN to a terminal at the onset of communications is that the GAN is not required to know the identity of the terminal in order to have encrypted communications with the terminal. However, a problem can arise if an unauthorized user attempts to impersonate a GAN and transmits a public key to the terminal. In that event, as described below, the terminal can be configured to authenticate the received public key and the identity of the GAN.

For example, when a public key is to be transferred from a GAN to a terminal, the key can be transferred with a public key "certificate". This certificate provides proof that the associated public key and the owner of that key are authentic. A "trusted" third party can issue the public key along with the certificate, which includes a "digital signature" that authenticates the third party's identity and the public key. The certificate can also contain the GAN's identity and the expiration date of the certificate, if any.

In one aspect of the invention, the GAN transmits the certificate and public key to the terminal. In that case, the public key of the third party is pre-stored (a priori) at the subscribing terminals.

Figure 5:
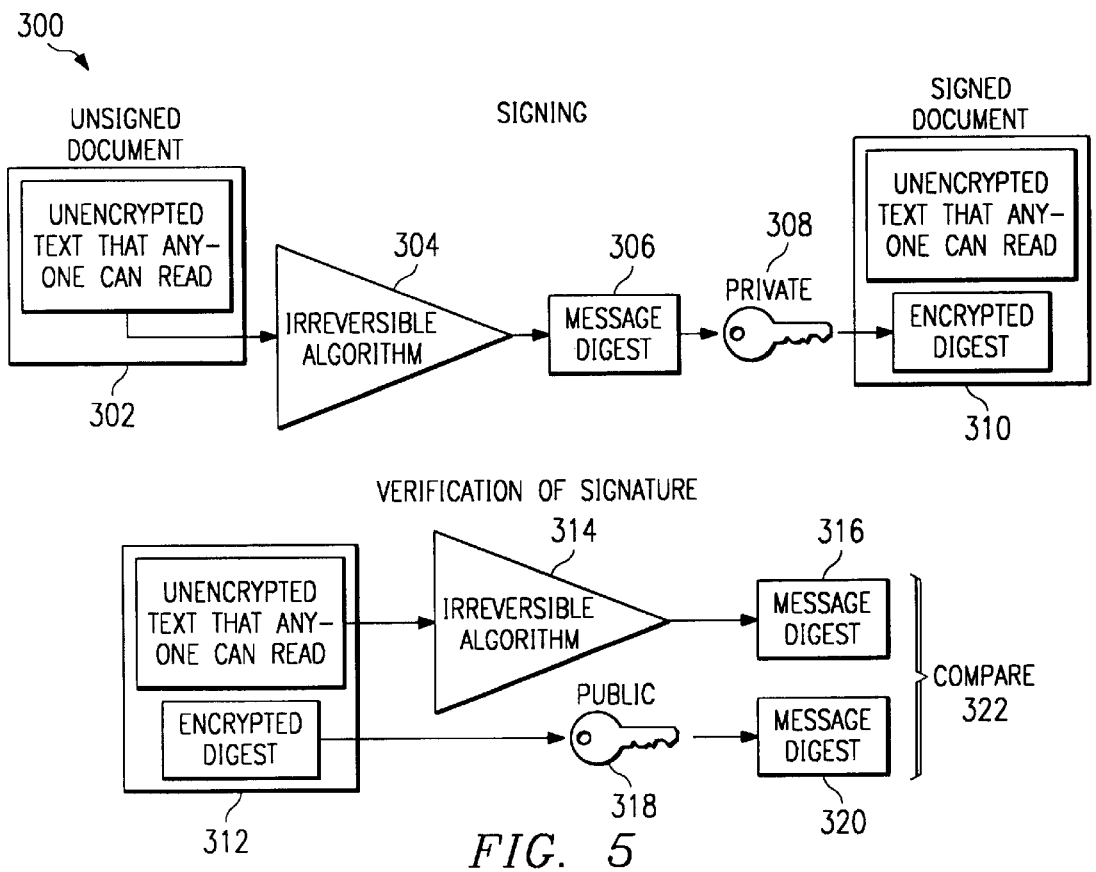
FIG. 5 is a block diagram of a method that can be used to certify the authenticity of a public key and the owner of the key with a digital signature, in accordance with a preferred embodiment of the present invention.

FIG. 5 is a block diagram of a method that can be used to certify the authenticity of a public key and the owner of the key with a digital signature, in accordance with the present invention. The method (300) of digitally signing a public key certificate and verifying its authenticity begins at step 302. At step 302, a "certificate" containing unencrypted information about the owner of the public key to be transferred to a terminal is prepared by a trusted third party. The unencrypted information also includes the public key and the expiration date of the certificate. At step 304, the resulting "unsigned" certificate is processed with an irreversible algorithm (e.g., a hashing algorithm) to produce a message digest at step 306, which is a digested or shortened version of the information included on the certificate. At step 308, the digest information is encrypted with a private key of a different public/private key pair. Preferably, an RSA algorithm similar to equations 1 and 2 above is used to derive this key pair. At step 310, a digitally signed public key certificate is thereby produced that contains the originally unencrypted information (including the public key to be used for the communications session) and the digest information, which is now encrypted with the certificate issuer's private key. The digitally signed public key certificate is then transferred to the terminal that has initiated contact with the GAN.

At step 312, upon receiving the digitally signed certificate, the terminal's processor analyzes the unencrypted and encrypted portions of the document. At step 314, the unencrypted information is processed using an algorithm identical to the hashing algorithm used at step 304. At step 316, a second digested version of the unencrypted information is produced at the terminal. At step 318, the terminal's processor retrieves the pre-stored certificate issuer's public key from memory, and using an RSA algorithm, decrypts the encrypted digest information from the certificate. Another version of the unencrypted digested information is thereby produced at step 320. At step 322, the terminal compares the two versions of the unencrypted digested information, and if the compared information is identical, the certificate's signature and the session public key are assumed to be authentic. That certified public key can now be used by the terminal to encrypt the secret session key.

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for encrypting communications traffic between a mobile communications network and a communications terminal, comprising the steps of:
    storing a public key and a first identifier associated with said mobile communications network at said communications terminal;
    comparing said first identifier stored at said communications terminal with a second identifier received from said mobile communications network;
    generating a secret key at said communications terminal when the first identifier matches the second identifier;
    encrypting said secret key with said stored public key at said communications terminal;
    transmitting said encrypted secret key from said communications terminal;
    receiving said encrypted secret key at said mobile communications network;
    decrypting said received encrypted secret key with a private key, said private key associated with said public key;
    encrypting said communications traffic with said secret key; and
    maintaining said encrypted communications traffic between said mobile communications network and said communications terminal when the mobile communications network does not know an identity of said communications terminal.

2. The method according to claim 1, wherein the step of storing a public key comprises the step of a priori prestoring the public key.

3. The method according to claim 1, further comprising the step of transmitting said public key from said mobile communications network upon receiving a public key request from said communications terminal.

4. The method according to claim 3, wherein the step of transmitting said public key further comprises the step of transmitting information to authenticate said public key.

5. The method according to claim 3, wherein the step of comparing further comprises the step of transmitting said public key request from said communications terminal when said first identifier does not match said second identifier.

6. The method according to claim 1, wherein the steps of receiving and decrypting said encrypted secret key are performed at a radio base station in said mobile communications network.

7. The method according to claim 1, wherein the step of decrypting said received encrypted secret key is performed at a radio network controller in said mobile communications network.

8. The method according to claim 1, wherein said mobile communications network comprises a generic communications network.

9. The method according to claim 1, wherein said communications terminal comprises a mobile terminal.

10. The method according to claim 1, wherein said communications terminal comprises a fixed terminal.

11. The method according to claim 1, wherein said mobile communications network comprises a cellular phone network.

12. The method according to claim 1, further comprising the steps of:
    connecting a plurality of service networks to said mobile communications network, a user of said communications terminal being a subscriber to at least one of said plurality of service networks; and
    providing a communications path between said communications terminal and said at least one of said plurality of service networks.

13. The method according to claim 1, wherein said private key and said public key are associated by an RSA Algorithm.

14. The method according to claim 1, wherein said secret key comprises a symmetric encryption key.

15. The method according to claim 1, wherein the step of generating a secret key comprises the step of generating a naturally occurring random number.

16. The method according to claim 1, wherein the step of generating a secret key comprises the steps of:
    detecting a received signal in digital form at said communications terminal; and
    extracting at least one low order bit from said detected received signal.

17. The method according to claim 1, wherein the step of generating a secret key comprises the steps of:
    detecting a signal at an output of a microphone A/D converter; and
    extracting at least one low order bit from said detected output signal.

18. The method according to claim 1, wherein the step of generating a secret key comprises the steps of:
    detecting a signal at an output of a speech codec; and
    extracting at least one low order bit from said detected output signal.

19. The method according to claim 1, wherein the step of generating a secret key comprises the steps of:

generating a seed for a pseudorandom number; and generating a pseudorandom number from said seed.

20. The method according to claim 1, wherein a length of said secret key is predetermined at said communications terminal.

21. The method according to claim 1, wherein said secret key further comprises a plurality of concatenated numbers.

22. The method according to claim 1, wherein the step of storing said public key and said first identifier further comprises storing an expiration date associated with said public key.

23. The method according to claim 22, wherein said communications terminal transmits a public key request to said mobile communications network if said public key has expired.

24. The method according to claim 1, further comprising the steps of:

changing said public key at said mobile communications network; and storing said changed public key at said communications terminal.

25. The method according to claim 24, wherein the step of changing said public key further comprises the step of broadcasting said changed public key from said mobile communications network for a predetermined period of time.

26. A method for encrypting traffic between a generic communications network and a first communications terminal, comprising the steps of:

broadcasting a public key from said generic communications network to a plurality of communications terminals, said plurality of communications terminals including said first communications terminal;

generating a secret key at said first communications terminal;

encrypting said secret key with said public key at said first communications terminal;

transmitting said encrypted secret key from said first communications terminal;

receiving said encrypted secret key at said generic communications network;

decrypting said received encrypted secret key with a private key, said private key associated with said public key;

encrypting said traffic with said secret key; and maintaining said encrypted traffic between said generic communications network and said first communications terminal when the generic communications network does not know an identity of said first communications terminal.

27. The method according to claim 26, wherein the broadcasting step further comprises the steps of:

transferring said public key from a radio network controller to at least one base station in said generic communications network; and transmitting said public key from said at least one base station.

28. The method according to claim 26, wherein said broadcasting step comprises the step of transmitting said public key from a plurality of base stations in said generic communications network.

29. The method according to claim 26, wherein the step of broadcasting said public key further comprises the step of broadcasting information to authenticate said public key.

30. The method according to claim 26, wherein the step of broadcasting said public key further comprises the step of transmitting, on request, information to authenticate said public key.

31. A method for encrypting communications traffic between a mobile communications network and a communications terminal, comprising the steps of:

storing two numbers associated with a Diffie-Hellman exponential key exchange algorithm and a first identifier associated with said mobile communications network at said communications terminal;

comparing said first identifier stored at said communications terminal with a second identifier received from said mobile communications network;

generating a first random number at said communications terminal when the first identifier matches the second identifier;

generating a second random number at said mobile communications network when the first identifier matches the second identifier; and using said first and second random numbers as inputs to said Diffie-Hellman exponential key exchange algorithm, generating a third number to be used as a secret key by said communications terminal and said mobile communications network;

encrypting said communications traffic with said secret key; and maintaining said encrypted communications traffic between said mobile communications network and said communications terminal when the mobile communications network does not know an identity of said communications terminal.

32. The method according to claim 31, wherein the step of storing two numbers comprises the step of a priori prestoring said two numbers.

33. The method according to claim 31, further comprising the step of transmitting said two numbers from said mobile communications network upon receiving a request for said two numbers from said communications terminal.

34. The method according to claim 33, wherein the step of comparing further comprises the step of transmitting said request from said communications terminal when said first identifier does not match said second identifier.

35. The method according to claim 31, wherein the step of storing said two numbers and said first identifier further comprisess toring an expiration date associated with said two numbers.

36. The method according to claim 35, wherein said communications terminal transmits a request for two new numbers associated with said Diffie-Hellman exponential key exchange algorithm if said two numbers has expired.

37. The method according to claim 31, further comprising the steps of:

changing said two numbers associated with a Diffie-Hellman exponential key exchange algorithm at said mobile communications network; and storing said changed two numbers at said communications terminal.

38. The method according to claim 37, wherein the step of changing said two numbers further comprises the step of broadcasting said changed two numbers from said mobile communications network for a predetermined period of time.

39. A method for encrypting traffic between a generic communications network and a first communications terminal, comprising the steps of:

broadcasting two numbers associated with an exponential key exchange algorithm from said generic communications network to a plurality of communications terminals, said plurality of communications terminals including said first communications terminal;

generating a first random number at said first communications terminal;

generating a second random number at said generic communications network;

using said first and second random numbers as inputs to said exponential key exchange algorithm, generating a third number to be used as a secret key by said first communications terminal and said generic communications network;

encrypting said traffic with said secret key; and maintaining said encrypted traffic between said generic communications network and said first communications terminal when the generic communications network does not know an identity of said first communications terminal.

40. A system for use in encrypting traffic between a generic communications network and a communications terminal, comprising:

an access network included in said generic communications network; and access network means coupled to said communications terminal and associated with said access network, for storing a public encryption key associated with said generic communications network, generating a secret key, encrypting said secret key with said stored public encryption key, transmitting said encrypted secret key to said generic communications network; encrypting said traffic with said secret key, and maintaining said encrypted traffic between said generic communications network and said communications terminal when the generic communications network does not know an identity of said communications terminal.

41. A system for use in encrypting traffic between a generic communications network and a communications terminal, comprising:

first network means for storing a private encryption key, distributing a public encryption key, and decrypting an encrypted secret session key;

second network means connected to said first network means, for broadcasting said distributed public encryption key, said first and second network means associated with an access network of said generic communications network; and access network means coupled to said communications terminal and associated with said access network of said generic communications network, for receiving said broadcast public encryption key, generating a secret key, encrypting said secret key with said received public encryption key, transmitting said encrypted secret key to said generic communications network; encrypting said traffic with said secret key; and maintaining said encrypted traffic between said generic communications network and said communications terminal when the generic communications network does not know an identity of said communications terminal.

42. The method according to claim 1, wherein the step of storing further comprises the step of requesting the public key from the mobile telecommunications network when the public key was not stored in the first place.

43. The method according to claim 1, wherein the step of storing further comprises the step of requesting a second public key from the mobile telecommunications network when utilization of the stored public key is unsuccessful.

44. The method according to claim 1, wherein the step of generating a secret key further comprises the steps of generating and changing the secret key using a pseudorandom number sequence.

45. The method according to claim 44, wherein the step of changing the secret key is triggered after encrypting a predetermined amount of the communications traffic, encrypting the communications traffic for a predetermined amount of time, or responding to a predefined request from the communications terminal or the mobile communications network.

46. The method according to claim 1, further comprising the step of enabling the communications terminal to generate, encrypt and transmit another secret key to the mobile communications network to be used instead of the secret key.

* * * * *

UNITED STATES PATENT AND TRADEMARK OFFICE
CERTIFICATE OF CORRECTION

PATENT NO. : 5,850,444
DATED : Dec. 15, 1998
INVENTOR(S) : Rune

It is certified that error appears in the above-identified patent and that said Letters Patent is hereby corrected as shown below:

On the title page,

Item [73]  Replace "L/M"
With --L M--

Column 14, line 43  Replace "comprisess toring"
With --comprises storing--

Signed and Sealed this

Sixth Day of July, 1999

Attest:

Q. TODD DICKINSON

Attesting Officer  Acting Commissioner of Patents and Trademarks